(12) United States Patent
Schott et al.

(10) Patent No.: US 12,044,408 B2
(45) Date of Patent: Jul. 23, 2024

(54) GAS TURBOMACHINE DIFFUSER ASSEMBLY WITH RADIAL FLOW SPLITTERS

(71) Applicant: General Electric Company, Schenectady, NY (US)

(72) Inventors: Carl Gerard Schott, Simpsonville, SC (US); Kenneth Damon Black, Travelers Rest, SC (US); Matthew Stephen Casavant, Boston, MA (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/344,954

(22) Filed: Jun. 30, 2023

(65) Prior Publication Data

US 2023/0358402 A1    Nov. 9, 2023

Related U.S. Application Data

(63) Continuation of application No. 15/912,243, filed on Mar. 5, 2018, now Pat. No. 11,732,892, which is a
(Continued)

(51) Int. Cl.
*F23R 3/10* (2006.01)
*F01D 9/02* (2006.01)
(Continued)

(52) U.S. Cl.
CPC ............... *F23R 3/10* (2013.01); *F01D 9/023* (2013.01); *F01D 9/04* (2013.01); *F01D 9/06* (2013.01);
(Continued)

(58) Field of Classification Search
CPC .. F04D 29/542; F23R 3/04; F23R 3/10; F23R 3/54
See application file for complete search history.

(56) References Cited

U.S. PATENT DOCUMENTS

| 2,682,363 A | 6/1954 | Lombard et al. |
| 3,049,882 A | 8/1962 | Labastie et al. |

(Continued)

FOREIGN PATENT DOCUMENTS

| EP | 0807211 B1 | 5/1999 |
| JP | 2002162036 A | 6/2002 |
| WO | WO2009043694 A2 | 4/2002 |

OTHER PUBLICATIONS

Landis, Gas Turbine Engine, Encyclopedia Blitannica, 2008, 9 Pages. https://www.britannica.com/technology/gas-turbine-engine.

*Primary Examiner* — Arun Goyal
*Assistant Examiner* — William L Breazeal
(74) *Attorney, Agent, or Firm* — Dority & Manning, P.A.

(57) ABSTRACT

A diffuser assembly includes a casing at a compressor aft end; an inner barrel member radially inward of the casing; and an array of radial flow splitters extending between the inner barrel member and the casing. Each radial flow splitter includes a leading edge facing into a flow of air, a trailing end wall opposite the leading edge, a pair of side walls extending between the leading edge and the trailing end wall, and an axis extending through the leading edge and the trailing end wall. A width of each radial flow splitter increases from the leading edge to the trailing end wall. The side walls diverge away from the axis in a downstream direction corresponding to the flow of air. Optionally, the side walls also diverge away from the axis in a radial direction between the inner barrel member and the casing.

19 Claims, 8 Drawing Sheets

Related U.S. Application Data continuation-in-part of application No. 13/966,667, filed on Aug. 14, 2013, now abandoned.

(51) Int. Cl.
    *F01D 9/04*         (2006.01)
    *F01D 9/06*         (2006.01)
    *F02C 3/06*         (2006.01)
    *F04D 29/54*       (2006.01)

(52) U.S. Cl.
    CPC .............. *F02C 3/06* (2013.01); *F04D 29/544* (2013.01); *F05D 2220/32* (2013.01); *F05D 2240/35* (2013.01); *F05D 2250/13* (2013.01)

(56) References Cited

U.S. PATENT DOCUMENTS

| | | | |
|---|---|---|---|
| 3,204,403 A | 9/1965 | Mordell | |
| 3,759,038 A | 9/1973 | Scalzo et al. | |
| 3,978,664 A | 9/1976 | Parker et al. | |
| 4,431,374 A | 2/1984 | Benstein et al. | |
| 4,918,926 A | 4/1990 | Nikkanen | |
| 5,077,967 A | 1/1992 | Widener et al. | |
| 5,165,850 A | 11/1992 | Humke et al. | |
| 5,224,819 A | 7/1993 | Kernon et al. | |
| 5,335,501 A | 8/1994 | Taylor | |
| 5,339,622 A | 8/1994 | Bardey et al. | |
| 5,353,586 A | 10/1994 | Taylor et al. | |
| 5,387,081 A | 2/1995 | LeBlanc | |
| 5,592,820 A | 1/1997 | Alary et al. | |
| 5,592,821 A | 1/1997 | Alary et al. | |
| 5,632,141 A | 5/1997 | Sloop et al. | |
| 5,737,915 A | 4/1998 | Lin et al. | |
| 5,839,283 A | 11/1998 | Dobbeling | |
| 6,401,447 B1 | 6/2002 | Rice et al. | |
| 6,513,330 B1 | 2/2003 | Rice et al. | |
| 6,554,569 B2 | 4/2003 | Decker et al. | |
| 6,637,209 B2 | 10/2003 | Kuo et al. | |
| 6,651,439 B2 | 11/2003 | Al-Roub et al. | |
| 6,672,070 B2 | 1/2004 | Bland et al. | |
| 6,843,059 B2 | 1/2005 | Burrus et al. | |
| 6,896,475 B2 | 5/2005 | Graziosi et al. | |
| 7,047,723 B2 | 5/2006 | Martling et al. | |
| 7,082,766 B1 | 8/2006 | Widener et al. | |
| 7,181,914 B2 | 2/2007 | Pidcock et al. | |
| 7,197,882 B2 | 4/2007 | Marnas et al. | |
| 7,574,864 B2 | 8/2009 | Tiemann | |
| 7,600,370 B2 | 10/2009 | Dawson | |
| 7,827,799 B2 | 11/2010 | O'Neill et al. | |
| 7,870,739 B2 | 1/2011 | Bland | |
| 7,874,158 B2 | 1/2011 | O'Neill et al. | |
| 8,057,170 B2 | 11/2011 | Latham | |
| 8,082,738 B2 | 12/2011 | Cornelius et al. | |
| 8,133,017 B2 | 3/2012 | Schott et al. | |
| 8,257,036 B2 | 9/2012 | Norris | |
| 8,276,390 B2 | 10/2012 | Yelmule et al. | |
| 8,328,513 B2 | 12/2012 | Kirtley | |
| 8,387,396 B2 | 3/2013 | Chen et al. | |
| 8,402,769 B2 | 3/2013 | Maltson | |
| 10,465,907 B2 | 11/2019 | Zong et al. | |
| 2004/0093871 A1 | 5/2004 | Burrus et al. | |
| 2006/0245910 A1 | 11/2006 | Buchal et al. | |
| 2007/0068165 A1 | 3/2007 | Tiemann | |
| 2010/0021293 A1 | 1/2010 | Schott | |
| 2010/0031673 A1 | 2/2010 | Maltson | |
| 2010/0037616 A1 | 2/2010 | Twell | |
| 2010/0239418 A1 | 9/2010 | Schott et al. | |
| 2011/0016878 A1 | 1/2011 | Berry et al. | |
| 2011/0192166 A1 | 8/2011 | Mulcaire | |
| 2011/0271688 A1 | 11/2011 | DiCintio et al. | |
| 2012/0014776 A1 | 1/2012 | Fulayter et al. | |
| 2012/0018543 A1 | 1/2012 | Lombard et al. | |
| 2012/0111012 A1 | 5/2012 | Axelsson et al. | |
| 2014/0260289 A1 | 9/2014 | Graves et al. | |
| 2014/0290272 A1 | 10/2014 | Mulcaire | |
| 2015/0176493 A1* | 6/2015 | Munsell .................. F01D 25/16 |
| | | | 415/230 |
| 2016/0084502 A1 | 3/2016 | Cunha et al. | |
| 2016/0169049 A1 | 6/2016 | Eastwood et al. | |
| 2016/0265371 A1 | 9/2016 | Dale et al. | |
| 2017/0044979 A1 | 2/2017 | Cheung et al. | |

\* cited by examiner

GAS TURBOMACHINE DIFFUSER ASSEMBLY WITH RADIAL FLOW SPLITTERS

CROSS-REFERENCE TO RELATED APPLICATIONS

This application is a continuation application of U.S. application Ser. No. 15/912,243 filed Mar. 5, 2018, which is a non-provisional application claiming the benefit of priority under 35 U.S.C. § 120 to U.S. Non-Provisional application Ser. No. 13/966,667, filed Aug. 14, 2013, which is hereby incorporated by reference in its entirety.

TECHNICAL FIELD

The subject matter disclosed herein relates to the art of turbomachines and, more particularly, to a compressor diffuser assembly for a gas turbomachine. The diffuser assembly includes radial flow splitters that extend between an inner barrel member and a forward casing at the aft end of a compressor.

BACKGROUND

In general, gas turbine engines combust a fuel/air mixture that releases heat energy to form a high temperature gas stream. The high temperature gas stream is channeled to a turbine portion via a hot gas path. The turbine portion converts thermal energy from the high temperature gas stream to mechanical energy that rotates a turbine shaft. The turbine portion may be used in a variety of applications, such as for providing power to a pump or an electrical generator or other mechanical device.

An industrial gas turbine, such as may be used for electrical power generation, generally includes a compressor section, a combustion section having one or more combustors, and a turbine section. The compressor section progressively increases the pressure of the working fluid to supply a compressed working fluid to the combustion section. The compressed working fluid is discharged from the compressor through a compressor diffuser assembly and is then routed through fuel nozzles that extend axially within a forward, or head, end of the combustor. A fuel is combined with the flow of the compressed working fluid to form a combustible mixture. The combustible mixture is burned within a combustion chamber to generate combustion gases having a high temperature, pressure, and velocity. The combustion chamber is defined by one or more liners or ducts that define a hot gas path through which the combustion gases are conveyed into the turbine section.

The combustion gases expand as they flow through the turbine section to produce work. For example, expansion of the combustion gases in the turbine section may rotate a shaft connected to a generator to produce electricity. The turbine may also drive the compressor by means of a shaft or rotor, which may be common to the turbine, the compressor, and the generator.

In a can-annular type combustion system, the combustion section includes multiple combustion cans (each having its own fuel nozzles and liner) that circumscribe the rotational axis of the gas turbine. Each combustor produces combustion gases that collectively drive the turbine section. The forward ends of the combustors have a larger cross-sectional area than the aft ends of the combustors to accelerate the flow of combustion gases entering the turbine section. The aft ends of the combustors are spaced at a first radial distance from the rotor, while the forward ends of the combustors are spaced at a second radial distance from the rotor that is larger than the first radial distance. As a result, the aft ends of the combustors are densely packed together to feed an annulus at the inlet end of the turbine section.

The compressor provides air for combustion and for cooling the combustor liner by directing the air through a diffuser assembly at the aft end of the compressor and between and around the combustors. The conventional diffuser, which is positioned radially between the aft ends of the combustors and the rotor, reduces the velocity of the air exiting the compressor and may assist in turning the air in a direction radially outward from the rotor to enter the combustors. In conventional diffusers, most of the turning from an axial direction to a radial direction occurs at the aft end of the diffuser assembly or downstream of its exit.

Conventionally, the inner barrel member and diffuser are supported by a plurality of struts that extend radially between the inner barrel member and the outer shell of the gas turbine. These struts, which are made of relatively thin metal, respond more rapidly to gas temperature changes than the bulkier inner barrel member and outer shell of the gas turbine. As a result, changes in temperature (as may occur during normal operation of the gas turbine) may cause distortion of the inner barrel member relative to the outer shell of the gas turbine.

Additionally, with demands for increased power output, gas turbines and their combustors are being made larger, thereby minimizing the space between adjacent combustors, particularly at their aft ends. The ability to effectively direct the compressed gas flow between the combustors becomes important in assuring the successful operation of the combustors and, therefore, the gas turbine.

SUMMARY

A diffuser assembly includes a casing at a compressor aft end; an inner barrel member radially inward of the casing; and an array of radial flow splitters extending between the inner barrel member and the casing. Each radial flow splitter includes a leading edge facing into a flow of air, a trailing end wall opposite the leading edge, a pair of side walls extending between the leading edge and the trailing end wall, and an axis extending through the leading edge and the trailing end wall. A width of each radial flow splitter increases from the leading edge to the trailing end wall. The side walls diverge away from the axis in a downstream direction corresponding to the flow of air and, optionally, also diverge away from the axis in a radial direction between the inner barrel member and the casing.

According to one aspect of an exemplary embodiment, a diffuser assembly for a gas turbomachine is provided. The diffuser assembly includes a forward casing disposed at an aft end of a compressor; an inner barrel member disposed radially inward of the forward casing; and an array of radial flow splitters. The array of radial flow splitters extends between the inner barrel member and the forward casing. Each radial flow splitter of the array of radial flow splitters includes a leading edge facing into a flow of air from the compressor, a trailing end wall opposite the leading edge, a pair of side walls extending between the leading edge and the trailing end wall, and a longitudinal axis extending through the leading edge and the trailing end wall. A width of each radial flow splitter increases from the leading edge to the trailing end wall. The pair of side walls diverge away from the longitudinal axis in a downstream direction corresponding to the flow of air.

According to another aspect of the exemplary embodiment, a gas turbomachine includes a compressor for compressing a flow of air; a plurality of combustors for combusting fuel with the flow of air to produce combustion products; a turbine driven by the combustion products, the turbine being coupled to the compressor; and a diffuser assembly. The diffuser assembly includes a forward casing disposed at an aft end of a compressor; an inner barrel member disposed radially inward of the forward casing; and an array of radial flow splitters extending between the inner barrel member and the forward casing. Each radial flow splitter of the array of radial flow splitters includes a leading edge facing into a flow of air from the compressor, a trailing end wall opposite the leading edge, a pair of side walls extending between the leading edge and the trailing end wall, and a longitudinal axis extending through the leading edge and the trailing end wall. A width of each radial flow splitter increases from the leading edge to the trailing end wall. The pair of side walls diverge away from the longitudinal axis in a downstream direction corresponding to the flow of air.

BRIEF DESCRIPTION OF DRAWINGS

The specification, directed to one of ordinary skill in the art, sets forth a full and enabling disclosure of the present system and method, including the best mode of using the same. The specification refers to the appended figures, in which.

The detailed description explains embodiments of the present diffuser assembly (including an inner barrel member and radial flow splitters), together with its advantages and features, by way of example with reference to the drawings.

DETAILED DESCRIPTION

To clearly describe the diffuser assembly, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine. Within the compressor or turbine sections, the term "forward" refers to components located toward the inlet end of the respective section, and the term "aft" refers to components located toward the outlet end of the respective section.

Additionally, the terms "leading" and "trailing" may be used and/or understood as being similar in description as the terms "forward" and "aft," respectively. "Leading" may be used to describe, for example, a surface of a flow splitter over or around which a fluid initially flows, and "trailing" may be used to describe a surface of the flow splitter over or around which the fluid finally flows.

Figure 1:
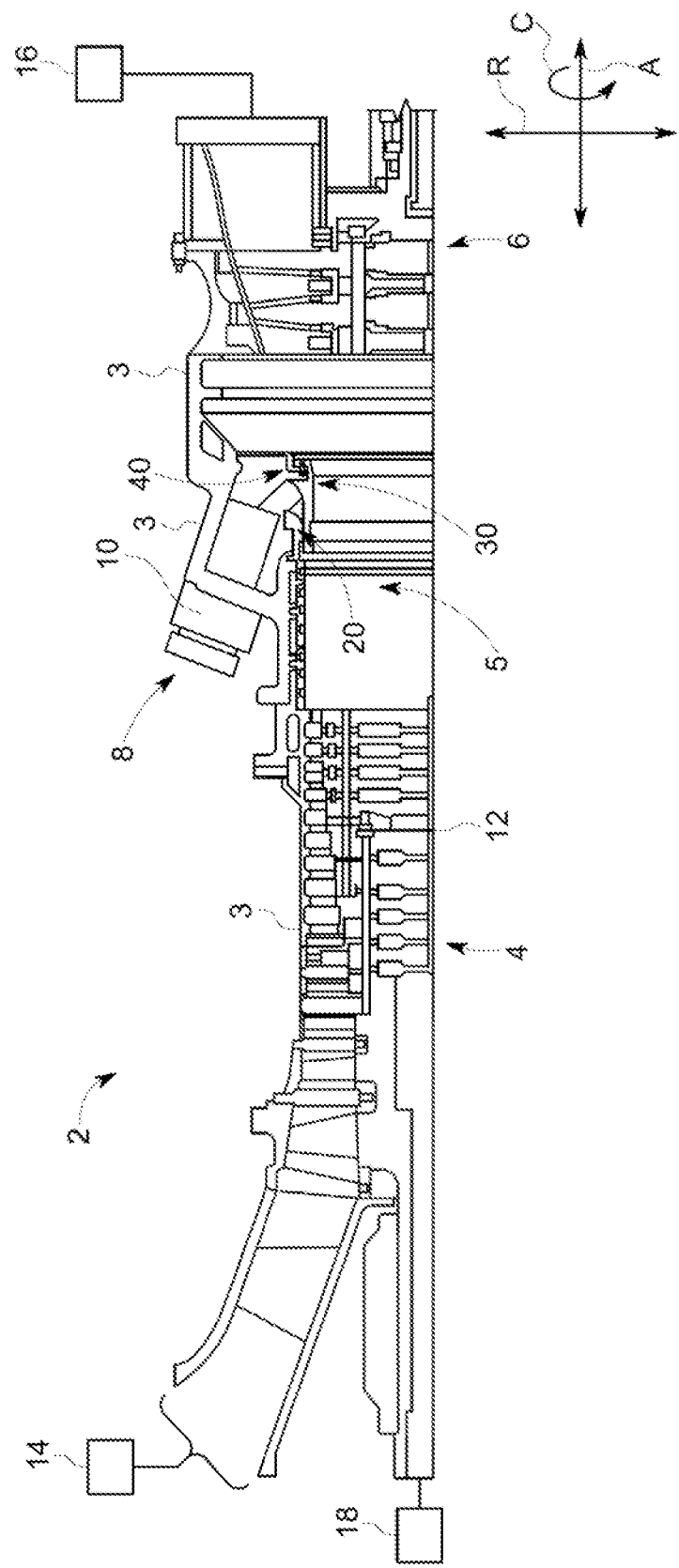
FIG. 1 is a cross-sectional schematic representation of a gas turbomachine that includes a diffuser assembly, in accordance with exemplary embodiments of the present disclosure.

It is often required to describe parts that are at different radial, axial and/or circumferential positions. As shown in FIG. 1, the "A" axis represents an axial orientation. As used herein, the terms "axial" and/or "axially" refer to the relative position/direction of objects along a longitudinal axis A, which is substantially parallel with the axis of rotation of the turbine system (in particular, the rotor section) or the longitudinal axis of a combustor. As further used herein, the terms "radial" and/or "radially" refer to the relative position or direction of objects along an axis "R", which is substantially perpendicular with axis A and intersects axis A at only one location. Finally, the term "circumferential" refers to movement or position around axis A (e.g., in a rotation "C"). The term "circumferential" may refer to a dimension extending around a center of a respective object (e.g., a rotor).

A turbomachine, in accordance with an exemplary embodiment, is indicated generally at 2 in FIG. 1. The turbomachine 2 includes an outer shell 3 that houses a compressor section 4 and a turbine section 6. The compressor section 4 and the turbine section 6 are mechanically linked through a common compressor/turbine rotor 12. The compressor section 4 is fluidly connected to the turbine section 6 through a combustor section 8. The combustor section 8 includes a plurality of combustors 10 (sometimes referred to as "combustion cans").

Air enters into the compressor section 4 through an intake system 14 fluidly connected to the compressor section 4 and is compressed through a series of stages of rotating blades and stationary vanes (not separately labeled). The compressed air flows through a forward (first) inner casing 20. A first portion of the compressed air is directed into the turbine wheel space (not separately labeled) for cooling purposes. A second portion of the compressed air is directed through a diffuser assembly 5 into the combustors 10 to mix with fuel to form a combustible mixture. The combustible mixture is combusted forming hot gases (also referred to as "combustion products").

The hot gases are directed from the outlets of the combustors 10 into the turbine section 6. The hot gases drive rotating blade members (not separately labeled) in the turbine section 6, converting thermal energy into mechanical energy that rotates the rotor 12. The mechanical energy passes through the rotor 12 to drive an external component 18, which may be a generator, a pump, or the like. The hot gases pass from the turbine section 6 through an exhaust system 16, which may treat the exhaust gases to lower emissions. Although FIG. 1 illustrates an exemplary arrangement in which the external component 18 is disposed at the forward end of the rotor 12 (upstream of the compressor section 4), it should be understood that the external component 18 may instead be located at the aft end of the rotor 12 (downstream of the turbine section 6 and exhaust section 16).

Figure 2:
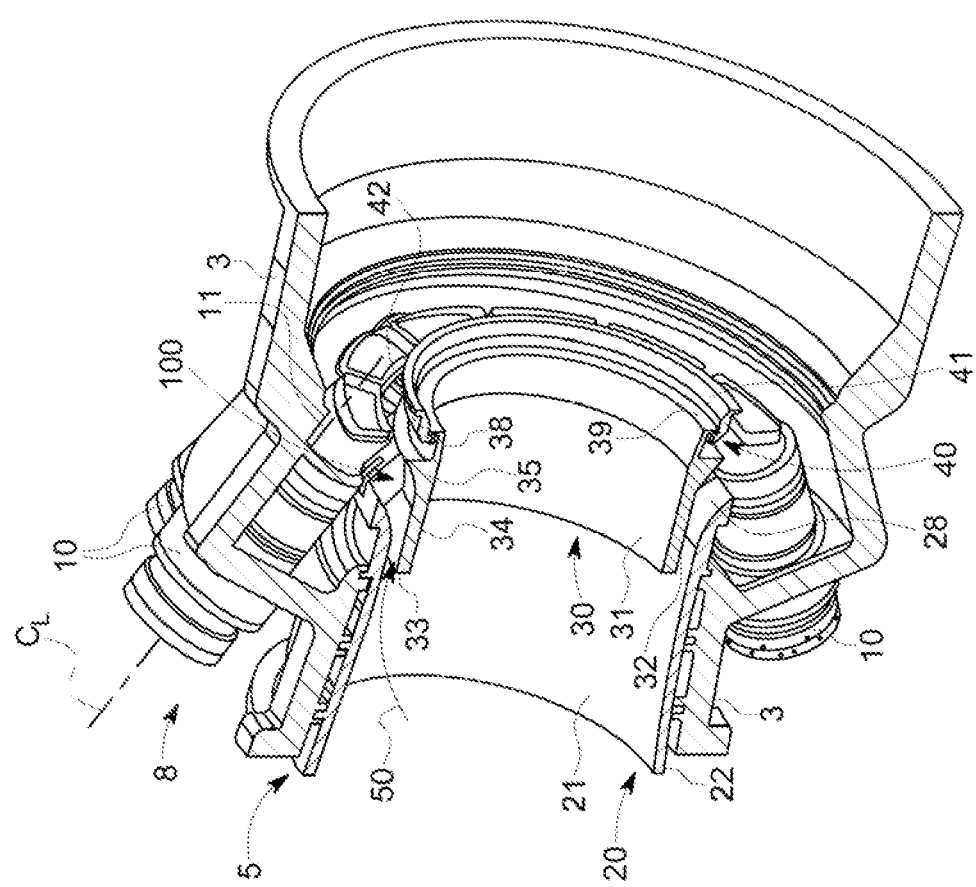
FIG. 2 is a partial perspective view of the combustor section and the diffuser assembly of the gas turbomachine of FIG. 1, illustrating an inner barrel member with a radial flow splitter in accordance with a first aspect of the present disclosure.
Figure 3:
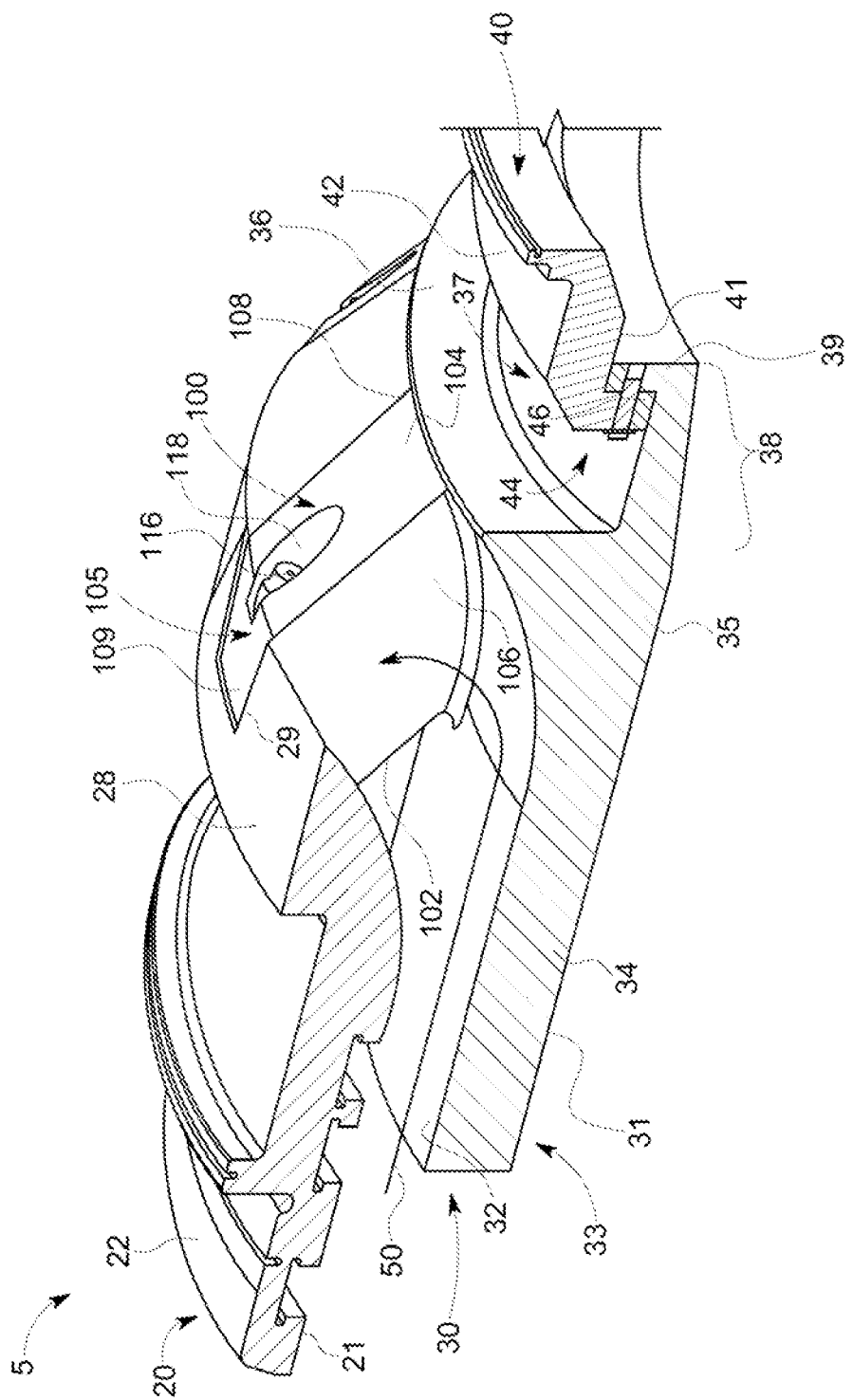
FIG. 3 is a perspective view of the diffuser assembly of FIG. 2.
Figure 4:
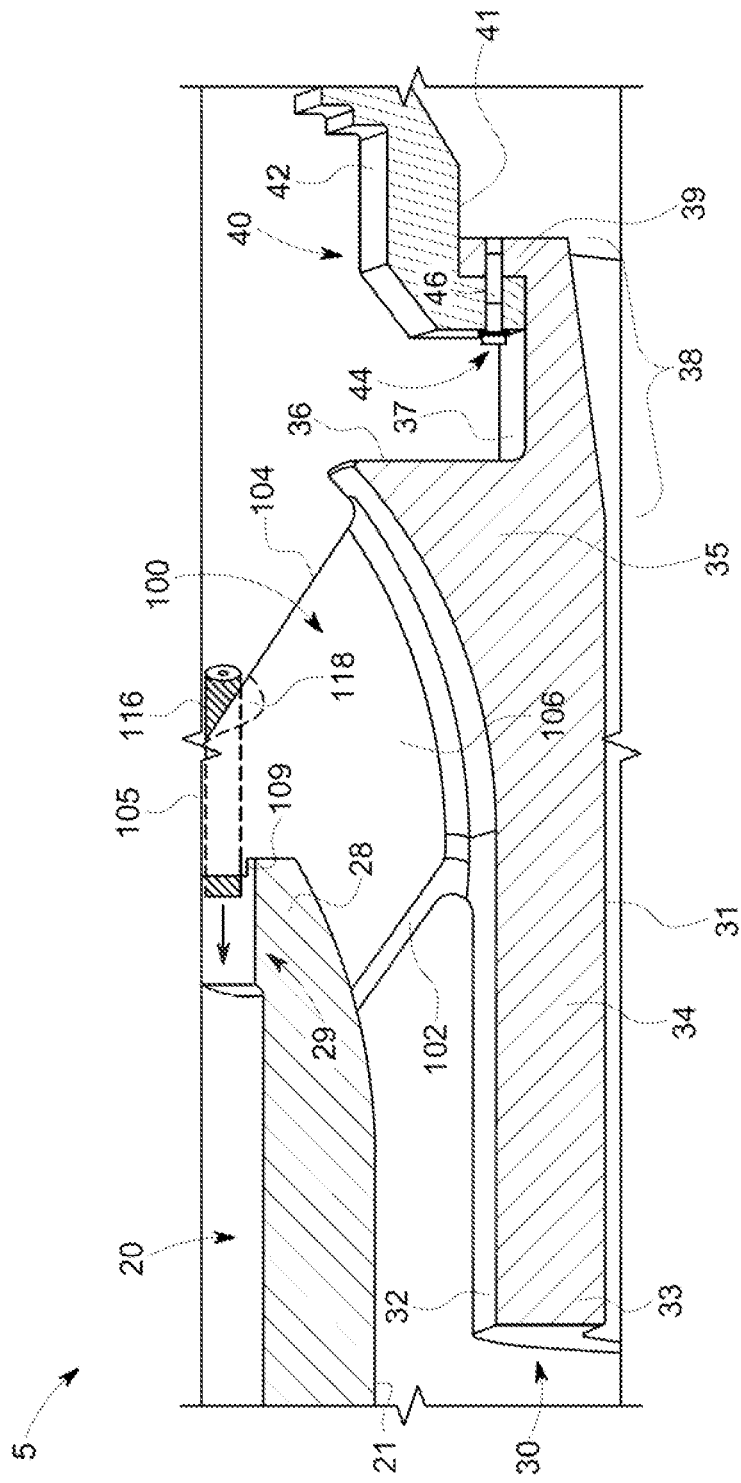
FIG. 4 is a side plan view of the diffuser assembly of FIG. 2.

The aft end of the compressor section 4 is shown in more detail in FIGS. 2 through 4, according to a first aspect of the present disclosure. The diffuser assembly 5 includes the forward casing 20, an inner barrel member 30 radially inboard of the forward casing 20, and a circumferential array of radial flow splitters 100 that extend radially between the inner barrel member 30 and the forward casing 20, as discussed further below.

The forward casing 20 extends axially between the last stage of compressor blades and vanes and the combustor section 8. The forward casing 20 includes an inner surface 21 and an outer surface 22 that is connected to, or made integrally with, the outer shell 3. The forward casing 20 is disposed radially outward of the inner barrel member 30.

The inner barrel member 30 has an upstream end 33, a downstream end 38, and an intermediate portion 34 that is disposed between the upstream end 33 and the downstream end 38. The intermediate portion 34 defines an inner surface 31 and an outer surface 32 of the inner barrel member 30. The aft end 35 of the intermediate portion 34 has a curved portion that curves radially outward from the inner surface 31 and terminates in a first radially oriented wall 36. At its forward end, an annular shelf 37 of the downstream end 38 of the inner barrel member 30 intersects the first radially oriented wall 36. The inner surface (not separately labeled) of the downstream end 38 may be inclined radially outward relative to the inner surface 31 of the intermediate portion 34, and the outer surface (defining the shelf 37) of the downstream end 38 may be positioned radially inward of the outer surface 32 of the intermediate portion 34.

At its aft end, the downstream end 38 of the inner barrel member 30 defines a second radially oriented wall 39 that is joined to an aft (second) inner casing 40 at a bolted joint 44 using mechanical fasteners 46, such as bolts. The second radially oriented wall 39 may have a shorter length in the radial direction than the first radially oriented wall 36. The aft inner casing 40, which may also be referred to as a "support ring," includes an inner surface 41 and an outer surface 42.

A compressor airflow path 50 is defined between the inner surface 21 of the forward casing 20 and the outer surface 32 of the inner barrel member 30. Compressor discharge air moves through airflow path 50 in a downstream direction, where its velocity is reduced by a plurality of radial flow splitters 100 that are distributed circumferentially about the outer surface 32 of the inner barrel member 30. The radial flow splitters 100 define flow passages 110 therebetween (see FIG. 5), which diffuse the airflow before it moves under and between transition pieces 11 at the aft ends of the combustors 10, as discussed below.

Figure 5:
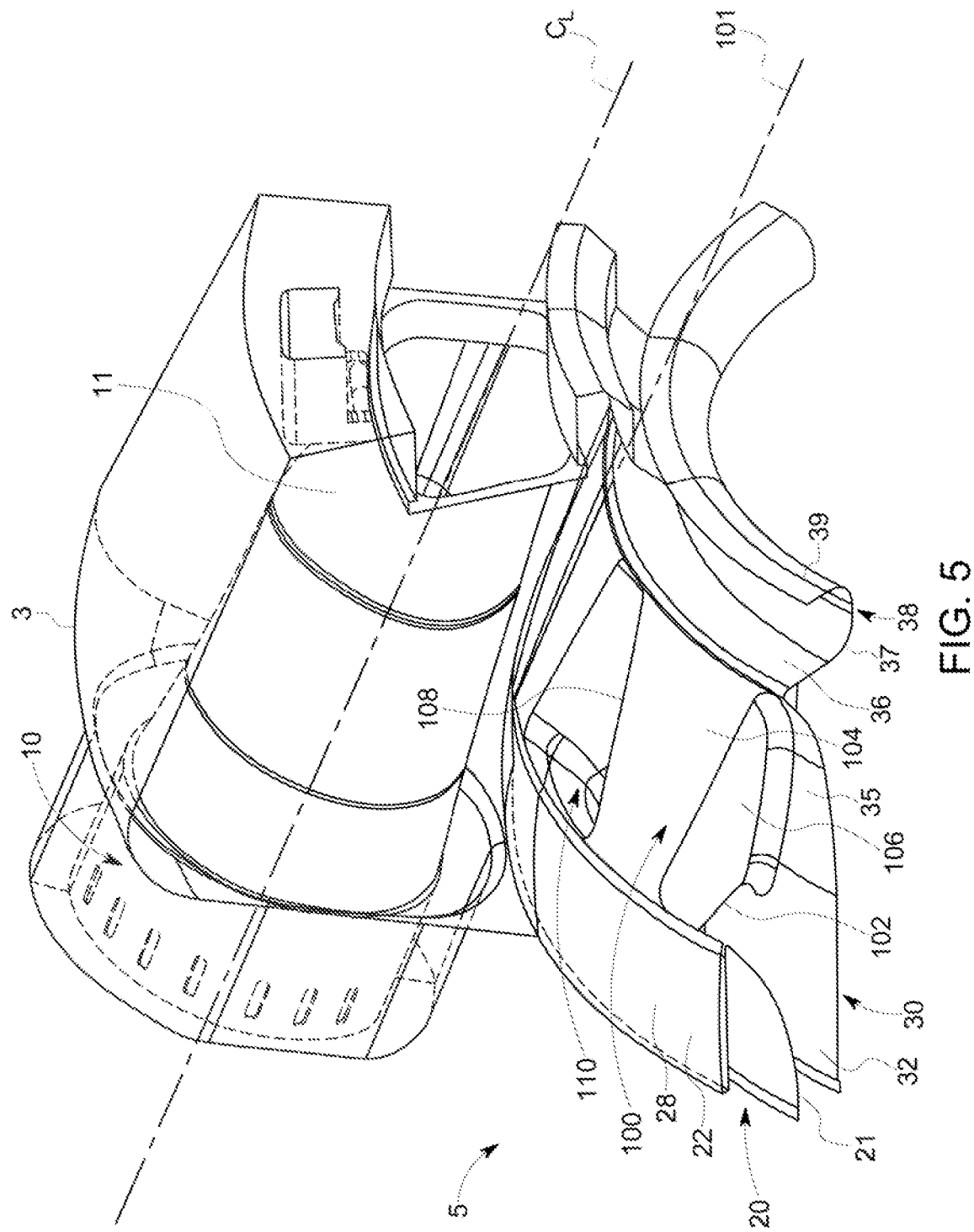
FIG. 5 is partial perspective view of a combustor and a diffuser assembly having an inner barrel member with integrated radial flow splitters, according to a second aspect of the present disclosure.

As shown in FIGS. 2 and 5, each radial flow splitter 100 is circumferentially aligned with a centerline $C_L$ of a respective combustor 10. More specifically, each radial flow splitter 100 is disposed radially inwardly of a corresponding transition piece 11 along the centerline $C_L$ of a respective combustor 10, such that a longitudinal axis 101 of the flow splitter 100 falls in the same radial plane as the centerline $C_L$. The radial flow splitters 100 have a wedge shape, as discussed further below, which guides the air passing along airflow path 50 from the compressor section 2 beneath and between the combustors 10 and, more specifically, into the gaps between adjacent transition pieces 11. The wedge shape of the flow splitters 100 reduces the velocity of the air and turns the air radially outward of the inner barrel member 30.

The radial flow splitters 100 may be attached to the outer surface 32 of the inner barrel member 30 or may be formed materially, integrally with the inner barrel member 30, as shown in FIGS. 2 through 4. Alternately, as shown in FIGS. 5 through 8, the diffuser assembly 5 including the forward casing 20, the inner barrel member 30, and the radial flow splitters 100 may be formed integrally together (for example, by casting) or may be fabricated from two or more parts that are assembled to produce a full circumference.

Figure 7:
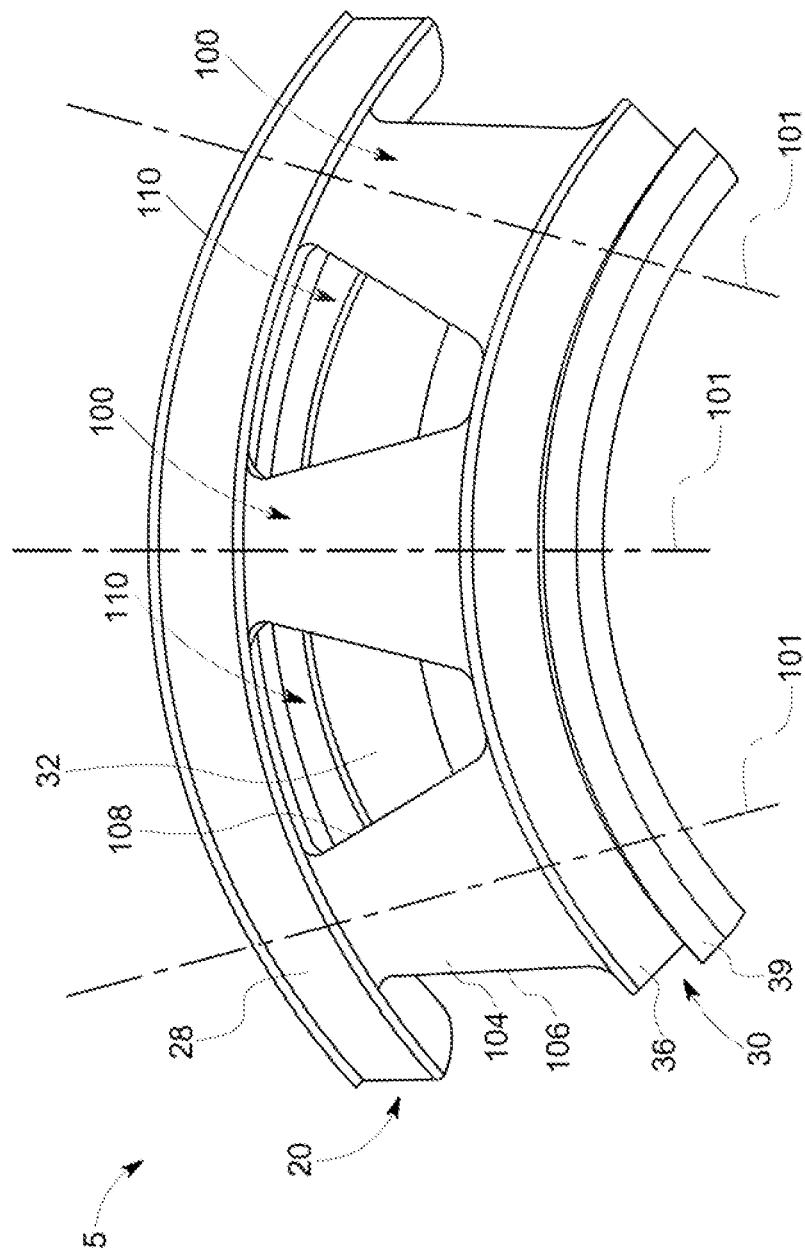
FIG. 7 is a partial perspective end view (aft-looking-forward) of the diffuser assembly of FIG. 5.
Figure 8:
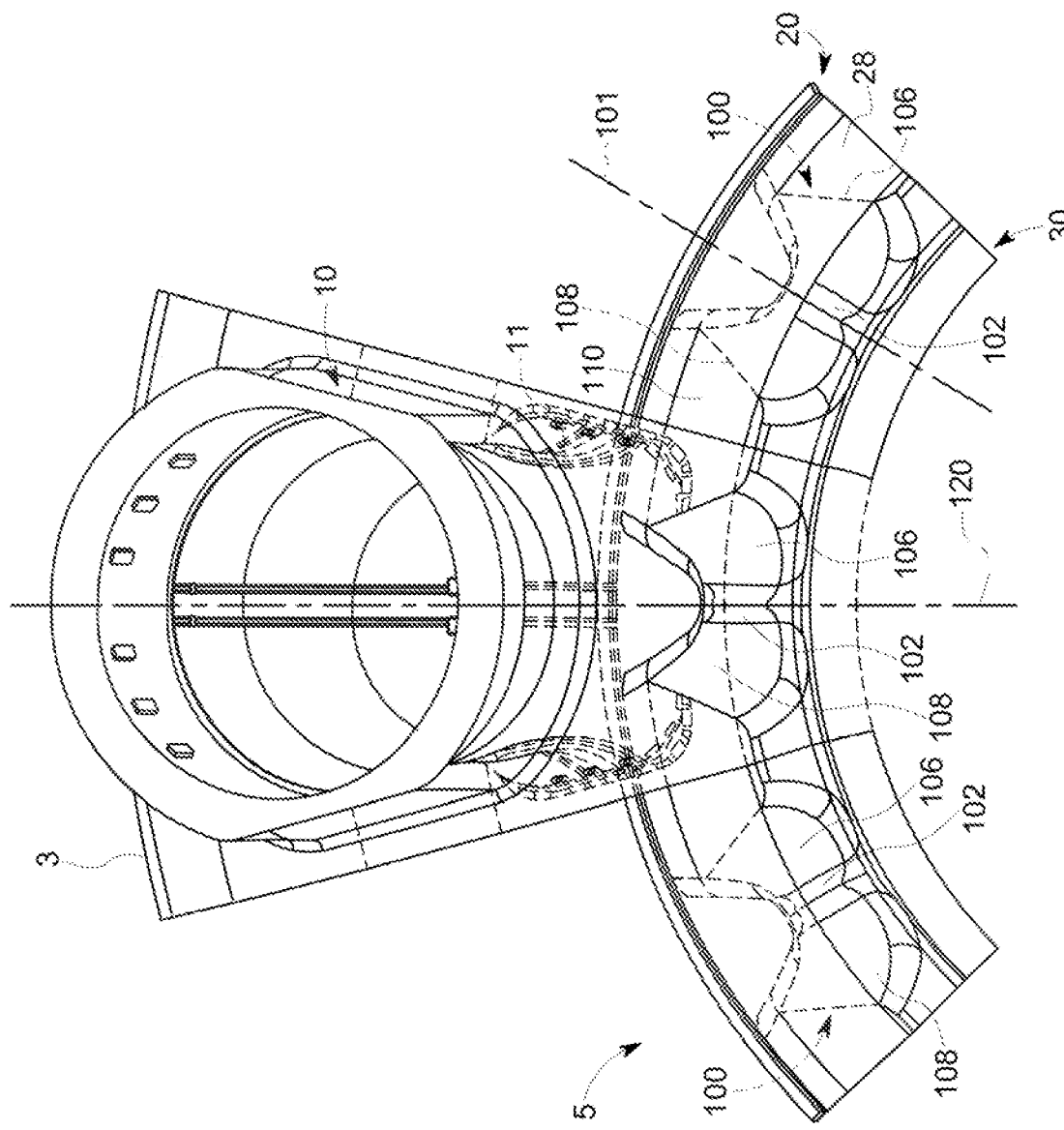
FIG. 8 is a partial perspective end view (forward-looking-aft) of the combustor and diffuser assembly of FIG. 5.

As shown in FIGS. 3 and 4, each flow splitter 100 includes a leading edge 102 and an opposing trailing end wall 104 that extend radially outward from the outer surface 32 of the inner barrel member 30. The leading edge 102 faces upstream (into the direction of airflow through airflow path 50), and the trailing end wall 104 is axially spaced downstream from the leading edge 102 and is wider in the circumferential direction than the leading edge 102. A first tapered or curvilinear side wall 106 and an opposing second tapered or curvilinear side wall 108 extend between the leading edge 102 and the trailing end wall 104. The first side wall 106 and the second side wall 108 diverge away from one another in the downstream direction between the leading edge 102 and the trailing end wall 104 (downstream relative to the flow of air through the airflow path 50). Additionally, in some embodiments, the first side wall 106 and the second side wall 108 diverge in a radial direction away from the longitudinal axis 101 of the flow splitter between the outer surface 32 of the inner barrel member 30 and the trailing end wall 104 and inner surface 21 of the forward casing 20 (see FIG. 8). As best seen in FIGS. 7 and 8, the flow splitter 100 is symmetrical about its longitudinal axis 101.

The leading edge 102 is disposed axially beneath an aft end 28 of the forward casing 20 and extends radially between the outer surface 32 of the inner barrel member 30 and the inner surface 21 of the forward casing 20. The trailing end wall 104 is disposed axially at the aft end 35 of the intermediate portion 34 of the inner barrel member 30 and forms a tapering surface that extends between the inner barrel member 30 and the top surface 105.

In the embodiment shown in FIGS. 3 and 4, a top surface 105 extends axially between the leading edge 102 and the trailing end wall 104 and extends circumferentially between the first side wall 106 and the second side wall 108. The top surface 105 defines a mounting element 109 that nests within a mounting feature 29 (such as a recess) at the downstream end 28 of the forward casing 20. The mounting element 109 engages the mounting feature 29 and is secured by a mechanical fastener 116 that is disposed through a bore (not shown) in the trailing end wall 104 of the radial flow splitter 100. The mechanical fastener 116 may be disposed within a countersink region 118 in the trailing end wall 104, as shown in FIG. 3.

In this manner, the inner barrel member 30 is supported within the forward casing 20, eliminating the need for conventional struts that extend between the outer turbine shell 3 and the inner barrel member 30. As discussed above, conventional struts may disrupt the airflow paths between adjacent combustors 10 and may cause distortion of the inner barrel member 30 due to their higher temperature sensitivity relative to the lower temperature sensitivity of the inner barrel member 30.

FIGS. 5 through 8 illustrate another aspect of the diffuser assembly 5, in which the forward casing 20, the inner barrel member 30, and an array of radial flow splitters 100 are formed integrally together, for example, by casting. As described above, the castings may be made in two or more pieces that are assembled to produce a full circumference. Alternately, the components may be fabricated individually and assembled by welding or other attachment methods. In these Figures, like numbers will be used to indicate like elements described in FIGS. 1 through 4 above.

FIG. 5 illustrates an exemplary combustor 10 within the outer shell 3 of the gas turbomachine (2, as shown in FIG. 1). The combustor 10 has an axial centerline $C_L$ that is aligned in the same radial plane as the longitudinal axis 101 of a corresponding radial flow splitter 100. The radial flow splitter 100 extends radially between the outer surface 32 of the inner barrel member 30 and the inner surface 21 of the forward casing 20. The radial flow splitter 100 is connected at its leading edge 102 to the inner surface 21 of the aft portion 28 of the forward casing 20. The trailing end wall 104 extends between the aft portion 28 of the forward casing 20 to the radially oriented wall 36 of the shelf 37 at the downstream end 38 of the inner barrel member 30.

Figure 6:
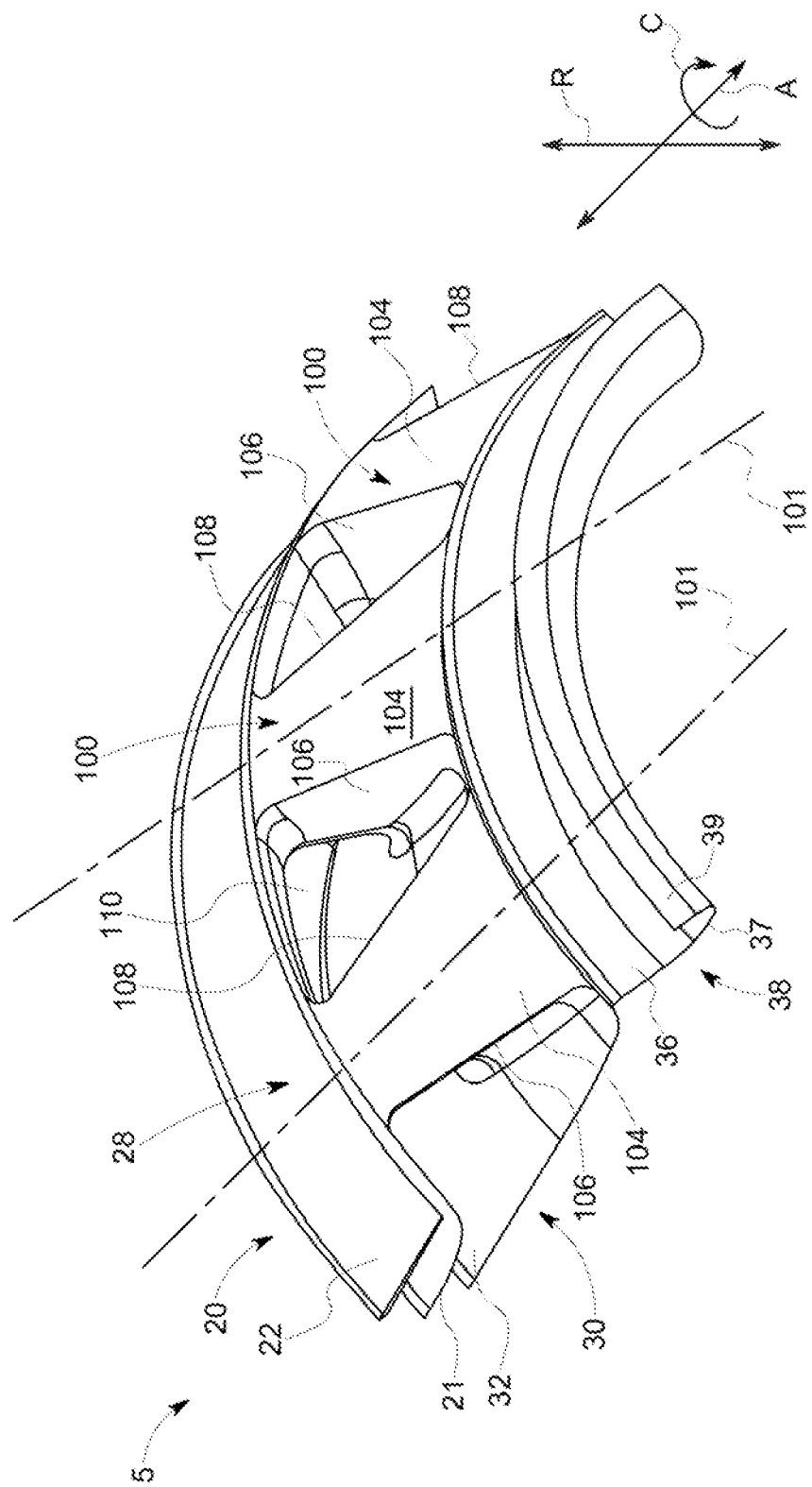
FIG. 6 is a partial perspective side view of the diffuser assembly of FIG. 5.

Within the diffuser assembly 5, flow passages 110 are defined between the circumferentially adjacent radial flow splitters 100. As shown in FIGS. 6 and 8, the shape of the radial flow splitters 100 determines the shape of the flow passages 110. In the exemplary illustrated embodiment, the flow passages 110 (between the second side wall 108 of a first flow splitter 100 and the first side wall 106 of an adjacent second flow splitter 100) have a shape that converges in the circumferential direction, as the flow moves downstream from the leading edge 102 to the trailing end wall 104. The flow passages 100 may also diverge in the radial direction from the outer surface 32 of the inner barrel member 30 to the inner surface 21 of the forward casing 20 and the trailing end wall 104. The convergence and divergence of the flow passages 110 causes the air flow from airflow path 50 to be spread into three directions (axially along the length of the radial flow splitters 100, radially along the height of the flow splitters 100, and circumferentially between the tapered surfaces of the side walls 106, 108 of the adjacent flow splitters 100). As a result, the airflow is diffused, and the velocity of the airflow is reduced.

FIG. 7 illustrates an overhead plan view of a portion of the diffuser assembly 5, which includes three circumferentially adjacent flow splitters 100. As shown, each flow splitter 100 is symmetrical about its longitudinal axis 101. The flow passages 110, which are defined between circumferentially adjacent flow splitters 100, are likewise symmetrical, thus ensuring consistent airflow to each of the combustors 10 (as shown in FIGS. 5 and 8).

FIG. 8 provides a forward-looking-aft view of the present radial flow splitters 100 of the diffuser assembly 5 and one of the combustors 10 disposed radially outward of one of the radial flow splitters 100. As previously described, the longitudinal axis 101 of the radial flow splitter 100 falls within the same plane 120 as the centerline axis $C_L$ of the combustor 10. The outer shell 3 and the forward casing 20 are illustrated as transparent, so that the underlying combustor 10 and the radial flow splitters 100, respectively, may be seen. As best seen in FIG. 8, the radial flow splitters 100 are defined by the leading edge 102, the side walls 106, 108, and the trailing end wall 104 (not seen in FIG. 8). One may observe from FIG. 8 that the width of the radial flow splitter 100 at its trailing end wall 104 approaches the width of the transition piece 11 of the combustor 10. The radial flow splitters 100 may be hollow, as shown, or may be solid.

While the leading edge 102 is illustrated as defining a radius of curvature between the side wall 106 and the side wall 108, such a structure is not required. Rather, the leading edge 102 may be replaced by a leading end wall (not shown) that has a width in the circumferential direction that is smaller than the width of the trailing end wall 104. The resulting flow splitter has a shape resembling a trapezoid, rather than a triangular wedge as illustrated herein.

At this point it should be understood that the exemplary embodiments describe a diffuser assembly having an inner barrel member with radial flow splitters that include tapered surfaces that guide compressor air between adjacent transition piece outlets to be consumed by the combustors in the generation of combustion products that pass from each combustor. Integrating flow splitters into the inner barrel member and, optionally, the forward casing eliminates the need for outer shell-mounted struts that impede the airflow path and that can contribute to distortion of the inner barrel member. As a result, the present diffuser assembly with its circumferential array of radial flow splitters that are integrated with the inner barrel member and, optionally, the forward casing, creates a more favorable flow field about the combustors, which improves combustion dynamics, improves performance, and reduces emissions.

Further, the incorporation of the present diffuser assembly configuration of radial flow splitters with the inner barrel member enables a turbomachine having a shorter diffusing section that nonetheless exhibits performance characteristics of longer turbomachine. Moreover, aligning the radial flow splitters with a centerline of each combustor promotes more complete mixing of compressed air passing between adjacent combustors and resulting combustion products exiting each transition piece outlet. It should also be understood that there need not be a radial flow splitter associated with each transition piece.

While the present diffuser assembly has been described in detail in connection with only a limited number of embodiments, it should be readily understood that the present subject matter is not limited to such disclosed embodiments. Rather, the diffuser assembly can be modified to incorporate any number of variations, alterations, substitutions or equivalent arrangements not heretofore described, but which are commensurate with the spirit and scope of the disclosure. While the technical advancements have been described in terms of various specific embodiments, those skilled in the art will recognize that the technical advancements can be practiced with modification within the spirit and scope of the claims.

What is claimed is:

1. A diffuser assembly for a gas turbomachine, the gas turbomachine comprising a plurality of combustors in a combustion section, the diffuser assembly comprising:
a forward casing disposed at an aft end of a compressor;

an inner barrel member disposed radially inward of the forward casing; and an array of radial flow splitters extending between the inner barrel member and the forward casing, each radial flow splitter of the array of radial flow splitters comprising a leading edge facing into a flow of air from the compressor, a trailing end wall opposite the leading edge, a pair of side walls extending between the leading edge and the trailing end wall, and a longitudinal axis extending through the leading edge and the trailing end wall, the longitudinal axis of each radial flow splitter of the array of radial flow splitters being circumferentially aligned with a centerline axis of a respective combustor of the plurality of combustors;

wherein a flow passage is defined between circumferentially adjacent radial flow splitters in the array of radial flow splitters;

wherein a width of each radial flow splitter increases from the leading edge to the trailing end wall and approaches a width of the respective combustor such that the flow passage circumferentially converges between the leading edge and the trailing end wall;

wherein the pair of side walls diverge away from the longitudinal axis in a downstream direction corresponding to the flow of air, and wherein the width of each radial flow splitter increases as the pair of side walls diverge away from the longitudinal axis in the downstream direction.

2. The diffuser assembly of claim 1, wherein the pair of side walls further diverge away from the longitudinal axis in a radial direction between the inner barrel member and the forward casing.

3. The diffuser assembly of claim 1, wherein each radial flow splitter of the array of radial flow splitters is axially and circumferentially disposed beneath an aft end of a respective combustor among the plurality of combustors of the gas turbomachine.

4. The diffuser assembly of claim 1, wherein the inner barrel member comprises an upstream end proximate to the compressor, a downstream end opposite the upstream end, and an intermediate portion extending between the upstream end and the downstream end; and wherein the intermediate portion comprises a curved portion terminating in a first wall extending radially from the inner barrel member, the array of radial flow splitters being disposed along the intermediate portion such that the respective trailing end walls terminate at the curved portion.

5. The diffuser assembly of claim 4, wherein the downstream end of the inner barrel member comprises the first wall, an annular shelf connected to the first wall, and a second wall extending radially from the annular shelf opposite the first wall; and wherein the second wall is connected to an aft inner casing of the compressor.

6. The diffuser assembly of claim 1, wherein each of the radial flow splitters of the array of radial flow splitters is integrally, materially formed with the inner barrel member.

7. The diffuser assembly of claim 1, wherein the inner barrel member, the array of radial flow splitters, and the forward casing are materially, integrally formed with one another around at least a portion of a circumference extending about a longitudinal axis of the gas turbomachine.

8. The diffuser assembly of claim 1, wherein each of the radial flow splitters of the array of radial flow splitters comprises a top surface extending from the leading edge to the trailing end wall and extending between the pair of side walls; and wherein the top surface comprises a mounting element configured to engage a mounting feature on the forward casing.

9. The diffuser assembly of claim 8, wherein each of the radial flow splitters is mechanically fastened to the forward casing through the mounting element.

10. A gas turbomachine comprising:
a compressor for compressing a flow of air;
a plurality of combustors for combusting fuel with the flow of air to produce combustion products;
a turbine driven by the combustion products, the turbine being coupled to the compressor;
an outer turbine shell that houses the compressor and the turbine and that at least partially surrounds the plurality of combustors; and
a diffuser assembly comprising:
a forward casing disposed at an aft end of the compressor radially inward of the outer turbine shell and the plurality of combustors, the forward casing defining a radially inner surface and a first radially outer surface;
an inner barrel member disposed radially inward of the forward casing and defining a second radially outer surface, the inner barrel member comprising a curved portion that diverges radially outwardly as the curved portion extends axially toward the turbine; and
an array of radial flow splitters each extending radially from a base coupled to the curved portion of the inner barrel member to a tip coupled to the forward casing, each radial flow splitter of the array of radial flow splitters comprising a leading edge facing into a flow of air from the compressor, the leading edge extending from the second radially outer surface of the inner barrel member and terminating at the radially inner surface of the forward casing, a trailing end wall opposite the leading edge, a pair of side walls extending between the leading edge and the trailing end wall, and a longitudinal axis extending through the leading edge and the trailing end wall;
wherein a circumferential width of each radial flow splitter of the array of radial flow splitters increases from the leading edge to the trailing end wall, and wherein the circumferential width of each radial flow splitter of the array of radial flow splitters continuously increases as the radial flow splitter extends radially from the tip to the base; and
wherein the pair of side walls diverge away from the longitudinal axis in a downstream direction corresponding to the flow of air.

11. The gas turbomachine of claim 10, wherein the pair of side walls have a height in a radial direction between the inner barrel member and the forward casing, the height tapering in the downstream direction.

12. The gas turbomachine of claim 10, wherein the respective longitudinal axis of each radial flow splitter of the array of radial flow splitters is aligned with a centerline axis of a respective combustor of the plurality of combustors.

13. The gas turbomachine of claim 12, wherein each radial flow splitter of the array of radial flow splitters is axially and circumferentially disposed beneath an aft end of a respective combustor of the plurality of combustors.

14. The gas turbomachine of claim 10, wherein the inner barrel member comprises an upstream end proximate to the compressor, a downstream end opposite the upstream end, and an intermediate portion extending between the upstream end and the downstream end; and wherein the intermediate portion comprises the curved portion terminating in a first wall extending radially from the inner barrel member, the array of radial flow splitters being disposed along the intermediate portion such that each respective trailing end wall terminates at the curved portion.

15. The gas turbomachine of claim 14, wherein the downstream end of the inner barrel member comprises an annular shelf connected to the first wall and a second wall extending radially from the annular shelf opposite the first wall; and wherein the second wall is connected to an aft inner casing of the compressor.

16. The gas turbomachine of claim 10, wherein each of the radial flow splitters of the array of radial flow splitters is integrally, materially formed with the inner barrel member.

17. The gas turbomachine of claim 10, wherein each of the radial flow splitters comprises a top surface extending from the leading edge to the trailing end wall and extending between the pair of side walls; and wherein the top surface comprises a mounting element configured to engage a mounting feature on the forward casing.

18. The gas turbomachine of claim 10, wherein the circumferential width of each radial flow splitter of the array of radial flow splitters is constant from the tip to the base at the leading edge.

19. The gas turbomachine of claim 10, wherein the base of each radial flow splitter of the array of radial flow splitters is defined at an intersection between the respective radial flow splitter and the inner barrel member, and wherein the tip of each radial flow splitter of the array of radial flow splitters is defined at an intersection between the respective radial flow splitter and the forward casing.

\* \* \* \* \*